(12) United States Patent
Matsudo (10) Patent No.: US 7,802,646 B2
(45) Date of Patent: Sep. 28, 2010

(54) SNOW VEHICLE

(75) Inventor: Shinichi Matsudo, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 242 days.

(21) Appl. No.: 11/956,798

(22) Filed: Dec. 14, 2007

(65) Prior Publication Data
US 2008/0185203 A1  Aug. 7, 2008

Related U.S. Application Data

(60) Provisional application No. 60/887,661, filed on Feb. 1, 2007.

(51) Int. Cl.
*B62M 27/02* (2006.01)
(52) U.S. Cl. .................. 180/190; 180/182; 180/184
(58) Field of Classification Search ............... 180/190, 180/182, 184
See application file for complete search history.

(56) References Cited

U.S. PATENT DOCUMENTS

| | | | | |
|---|---|---|---|---|
| 5,660,245 A | * | 8/1997 | Marier et al. ............... | 180/190 |
| 5,944,133 A | * | 8/1999 | Eto ............................. | 180/190 |
| 5,996,717 A | * | 12/1999 | Hisadomi .................. | 180/182 |
| 6,604,594 B2 | * | 8/2003 | Wubbolts et al. .......... | 180/186 |
| 7,014,004 B2 | | 3/2006 | Etou | |
| 7,353,901 B2 | * | 4/2008 | Abe et al. .................. | 180/190 |
| 2002/0112909 A1 | * | 8/2002 | Nishijima .................. | 180/190 |
| 2003/0183436 A1 | * | 10/2003 | Karpik ....................... | 180/190 |

* cited by examiner

*Primary Examiner*—Lesley Morris
*Assistant Examiner*—Marlon A Arce
(74) *Attorney, Agent, or Firm*—Keating & Bennett, LLP (57) ABSTRACT

A snow vehicle includes a track belt unit having an endless track belt, an engine arranged to drive the track belt unit, a steering mechanism to which a pair of steerable skis positioned in a forward direction of the track belt unit and being steerable to the left and right are attached, a rod-shaped steering shaft coupled to the pair of steerable skis via the steering mechanism, a rod-shaped handlebar section coupled to the steering shaft and adapted to be gripped by a rider, and a pair of left and right footrests which allow the rider to rest the rider's feet thereon. A straight line that is perpendicular or substantially perpendicular to a longitudinal direction of the steering shaft extends from an upper end of the steering shaft to each footrest, as seen in a side view of the snow vehicle.

3 Claims, 7 Drawing Sheets

SNOW VEHICLE

BACKGROUND OF THE INVENTION

1. Field of the Invention

The present invention relates to a snow vehicle including a track belt unit with an endless track belt, and a pair of steerable skis positioned in a forward direction of the track belt unit and being steerable to the left and right.

2. Description of the Related Art

Conventional snow vehicles, or snowmobiles, including a track belt unit with an endless track belt, and a pair of steerable skis positioned in a forward direction of the track belt unit and being steerable to the left and right have a rod-like handlebar section (hereinafter referred to as "handlebar") which is operable by a rider to change the direction of the steerable skis.

The handlebar is coupled to a steering shaft. The steering shaft is rotatable by the handlebar, and is coupled to the steerable skis via tie rods and the like. Generally, such a steering shaft extends in a vertical direction (see, for example, Japanese Laid Open Patent No. JP-A-2003-54483, pages 3 to 4 and FIGS. 1 to 2 thereof). As a result, left and right lateral ends of the handlebar attached to the steering shaft will move in a longitudinal direction of the snow vehicle by a relatively large amount, as the rider steers the snow vehicle.

Unfortunately, in the conventional snow vehicles of this type, since the left and right lateral ends of the handlebar move in the longitudinal direction by a relatively large amount while the rider is steering the snow vehicle, the handlebar can be operated relatively easily when the rider is straddling the seat. However, when the rider is standing on the footrests, or in a standing position, the handlebar can be operated less easily.

SUMMARY OF THE INVENTION

In order to overcome the problems described above, preferred embodiments of the present invention provide a snow vehicle which provides enhanced operability of a rod-like handlebar section, specifically operability of the handlebar section while the rider is in a standing position.

According to a preferred embodiment of the present invention, a snow vehicle includes a track belt unit having an endless track belt, a steering mechanism to which a pair of steerable skis positioned in a forward direction of the track belt unit and being steerable to the left and right are attached, a rod-like steering shaft coupled to the steerable skis via the steering mechanism, a rod-like handlebar section coupled to the steering shaft and adapted to be gripped by a rider, and a pair of left and right footrests which allow the rider to rest the rider's feet thereon, in which a straight line that is perpendicular or substantially perpendicular to a longitudinal direction of the steering shaft extends from an upper end of the steering shaft to each footrest, as seen in a side view of the snow vehicle.

Each footrest preferably extends in a longitudinal direction of the snow vehicle, and the straight line extends to a position in front of a central portion in a longitudinal direction of each footrest.

The snow vehicle also preferably includes a seat to be straddled by the rider, in which each footrest is positioned below a front end of the seat.

The snow vehicle also preferably includes an engine for driving the track belt unit, in which the steering shaft is positioned above the engine and an accessory thereof.

The snow vehicle also preferably includes a steering shaft support arranged to rotatably support the upper end of the steering shaft.

A lateral end of the handlebar section in a steering direction is preferably positioned below the steering shaft support as each steerable ski is turned to a limit position in the steering direction.

The foregoing and other elements, features, steps, characteristics, aspects, and advantages of the present invention will become more apparent from the following detailed description of preferred embodiments thereof when taken in conjunction with the accompanying drawings.

DETAILED DESCRIPTION OF THE PREFERRED EMBODIMENTS

Preferred embodiments of the present invention will now be described. In the following descriptions in regard to the drawings, identical or similar elements are denoted by the identical or similar reference numerals. It should be noted that each drawing is a schematic diagram, and may represent different dimensional ratios and the like from those of the actual vehicle.

Hence, specific dimensions and the like should be determined in consideration of the following descriptions. Furthermore, as a matter of course, different drawings include elements which have different dimensional relations and ratios.

General Structure of Snow Vehicle

Figure 1:
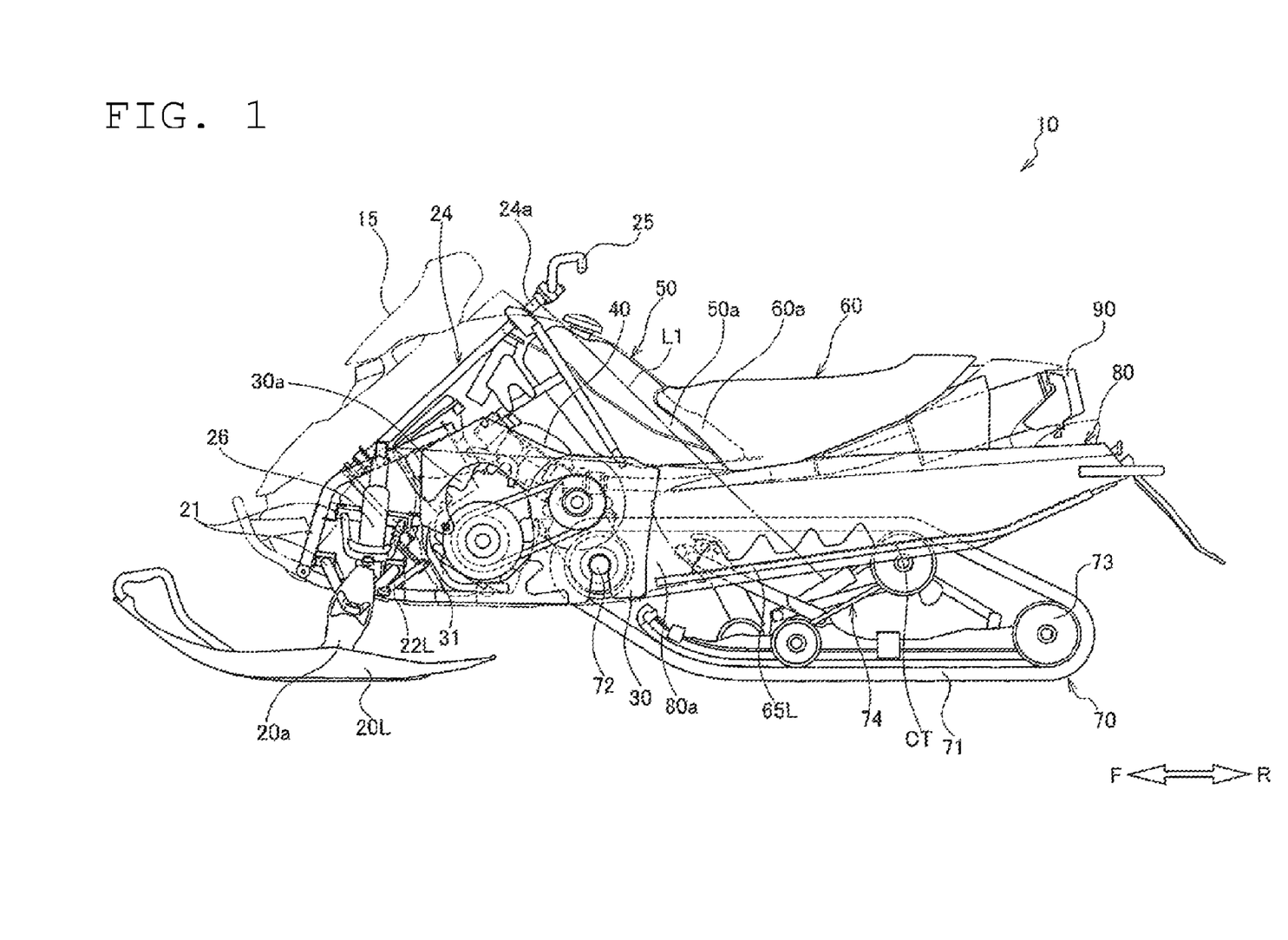
FIG. 1 is a left side elevation generally illustrating a snow vehicle in accordance with a preferred embodiment of the present invention.
Figure 2:
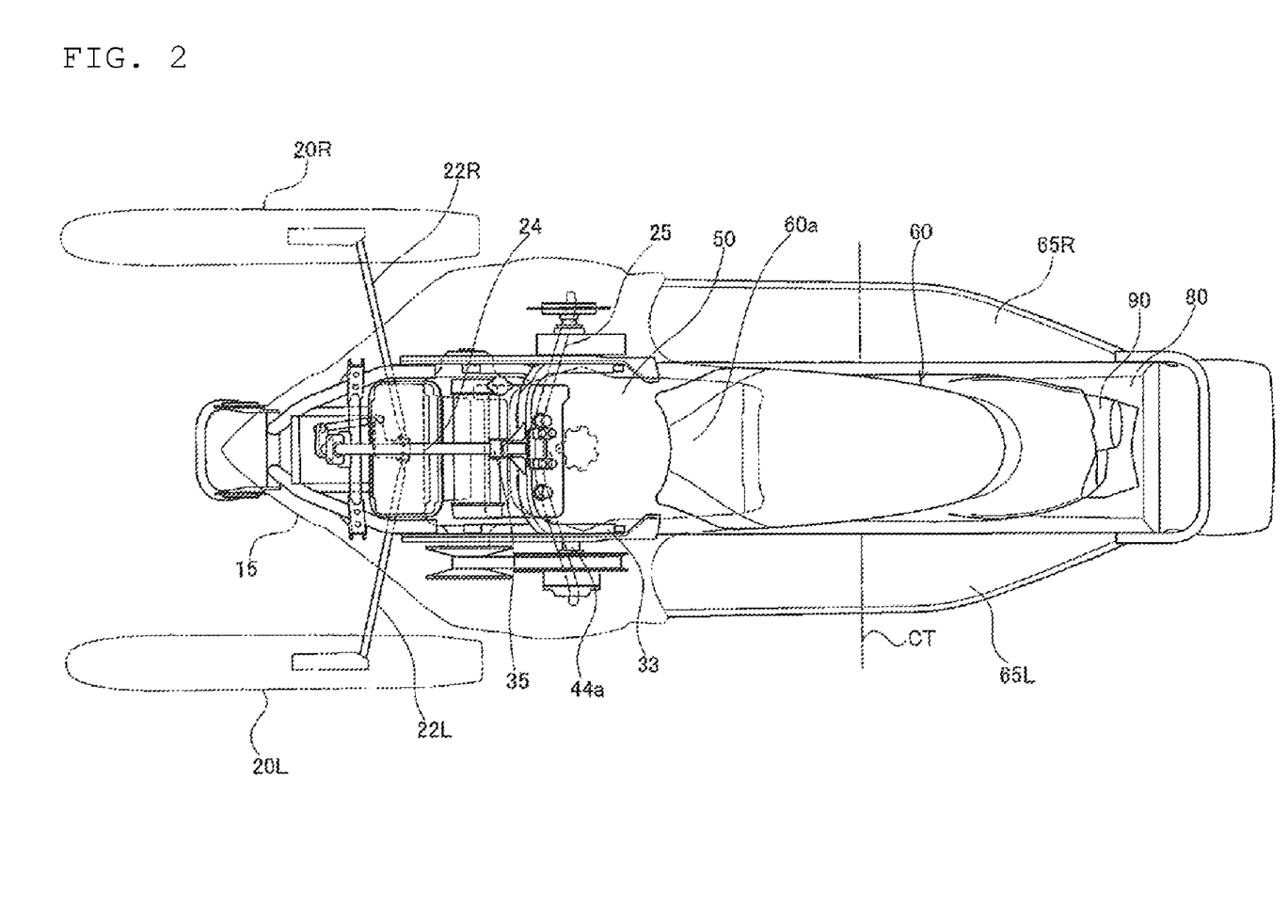
FIG. 2 is a plan view generally illustrating the snow vehicle in accordance with a preferred embodiment of the present invention.

Description will be first made of the general structure of a snowmobile 10 forming a snow vehicle in accordance with the present preferred embodiment. FIG. 1 is a left side elevation generally illustrating the snowmobile 10. FIG. 2 is a plan view generally illustrating the snowmobile 10.

As shown in FIGS. 1 and 2, the snowmobile 10 includes a track belt unit 70, and steerable skis 20L, 20R which are steerable to the left and right. The snowmobile 10 can be used for athletic events such as snowcross, and thus there is always a strong demand for its high moving performance.

(1) Structure of Steering System

The steerable skis 20L, 20R are positioned in a forward direction of the track belt unit 70. The steerable ski 20L is supported by an arm 21 for left-and-right steering movement.

The steerable ski 20L (20R), specifically a knuckle 20a coupled to the steerable ski 20L, is coupled to a tie rod 22L (22R). The tie rods 22L, 22R are coupled to a link 23 (which is not shown in FIGS. 1 and 2; see FIG. 3).

Figure 3:
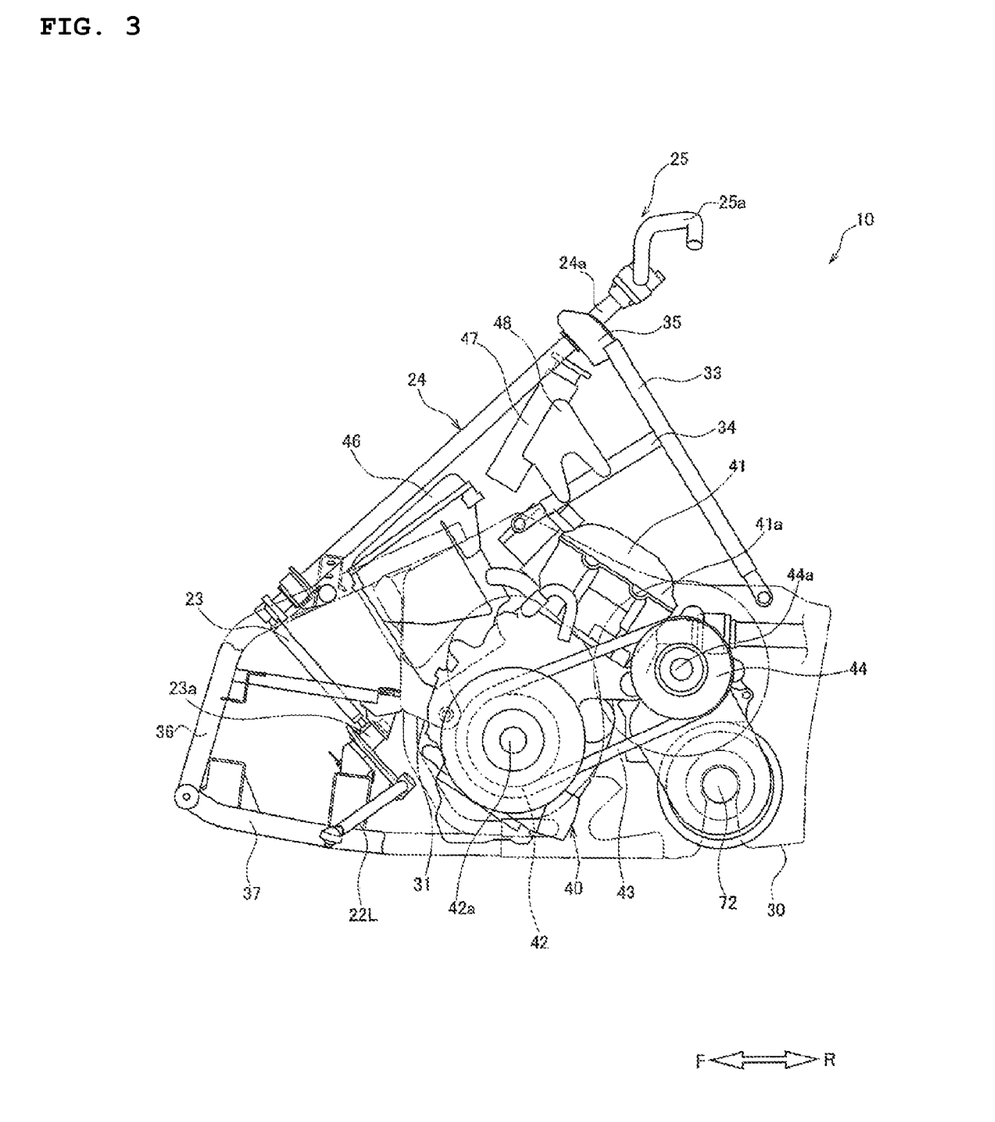
FIG. 3 is an enlarged left side elevation of a front portion of the snow vehicle in accordance with a preferred embodiment of the present invention.

To the link 23, a steering shaft 24 is coupled. Specifically, the steering shaft 24 is coupled at the lower end (front end) to the link 23. The steering shaft 24 is preferably a round rod-like steering shaft. The steering shaft 24 is coupled to the steerable ski 20L (20R) via the tie rod 22L (22R) and the link 23.

A handlebar 25 is coupled to the steering shaft 24. The handlebar 25 is preferably a rod-like handlebar section to be gripped by a rider.

The handlebar 25 preferably has hook-shaped left and right ends. This provides the rider increased flexibility in the riding position as the rider changes the gripping position of the handlebar 25.

The steerable ski 20L, 20R is coupled to a front suspension 26. The front suspension 26 allows the steerable ski 20L to move generally vertically in a manner absorbing the shock received by the steerable ski 20L. It should be understood that although not shown in FIGS. 1 and 2, the steerable ski 20R is also coupled to a front suspension that operates in the same manner as the front suspension 26.

The front suspension 26 preferably includes a coil spring (not shown) and a damper unit.

(2) Structure of Frame

The snowmobile 10 includes a front frame 30 and a rear frame 80 (see FIG. 2). The front frame 30 preferably includes a pair of left and right tabular members formed by die casting, for example.

A sub-frame 31 is coupled to the front frame 30. In other words, the sub-frame 31 and the front frame 30 are separate parts. The sub-frame 31 is fastened to the front frame 30 preferably with bolts (not shown). The sub-frame 31 is fastened to the front frame 30 after an engine 40 is attached to the front frame 30. The engine 40 is also coupled to the sub-frame 31.

The front frame 30 has a cutout 30a shaped so as to avoid interference with the engine 40 in the state where the sub-frame 31 is fastened to the front frame 30. The front frame 30, the engine 40 and others are shielded by a cowl 15.

The rear frame 80 is coupled at the front end 80a to the front frame 30 and extends rearward beyond the rear end of the track belt unit 70.

(3) Engine, Track Belt Unit and Others

The engine 40 preferably is an in-line, three cylinder, four-stroke engine. The engine 40 drives the track belt unit 70.

The track belt unit 70 includes a track belt 71, a front axle 72, a rear axle 73 and a rear suspension unit 74. The track belt 71 preferably is an endless track belt and has a pattern of projecting ribs (not shown) on its surface which are arranged at certain intervals.

The front axle 72 is provided at the front end of the track belt unit 70. The front axle 72 is driven by the engine 40. The specific operating mechanism of the track belt unit 70 will be described below.

The rear axle 73 is provided at the rear end of the track belt unit 70. The track belt 71 is stretched between the front axle 72 and the rear axle 73. On the inside of the track belt 71, there is disposed the rear suspension unit 74.

A fuel tank 50 stores therein fuel to be supplied to the engine 40. The fuel tank 50 is disposed above the front frame 30 and the rear frame 80. The fuel tank 50 is shaped so as to rise obliquely upward of the snowmobile 10 from the front frame 30 and the rear frame 80.

Behind the fuel tank 50, a seat 60 to be straddled by the rider is disposed. The front end 60a of the seat 60 covers the rear end 50a of the fuel tank 50.

In a position below the front end 60a of the seat 60, there are disposed a pair of left and right footrests 65L and 65R on which the rider can rest his/her feet. The footrests 65L, 65R extend in a longitudinal direction of the snowmobile 10. The footrests 65L, 65R are coupled to the rear frame 80.

The snowmobile 10 preferably has a layout as described below. More specifically, a straight line L1 is perpendicular or substantially perpendicular to a longitudinal direction of the steering shaft 24, and extends from the upper end of the steering shaft 24 to the footrest 65L (65R) as seen in the side view of the snowmobile 10. Specifically, the straight line L1 extends to a position in front of a central portion CT in a longitudinal direction of the footrest 65L (65R).

A muffler 90 communicates with the engine 40. The muffler 90 serves to reduce the volume of the operating noise from the engine 40 and emit an exhaust gas rearward of the snowmobile 10.

Specific Structure of Front Portion of Snow Vehicle

Description will now be made of the specific structure of a front portion of the snowmobile 10 involving an essential part of the present invention. FIG. 3 is an enlarged left side elevation of a front portion of the snowmobile 10. As described above, the engine 40 is attached to the front frame 30.

The engine 40 has a cylinder head 41. The engine 40, specifically the cylinder head 41, is inclined rearward of the snowmobile 10. The rear end 41a of the cylinder head 41 is in generally the same position as the handlebar 25 in a longitudinal direction of the snowmobile 10 (F-R direction in the figure).

The engine 40 has a crankshaft 42a. On the crankshaft 42a, a pulley 42 is mounted. In a position closely behind the engine 40, there is disposed a pulley 44 mounted on a pulley shaft 44a. The pulley shaft 44a is rotatably supported by the front frame 30. Between the pulley 42 and the pulley 44, a drive belt 43 is stretched.

As shown in FIG. 2, the pulley shaft 44a extends to the right side of the snowmobile 10. A drive gear (not shown) is rotatably attached to a generally middle portion of the pulley shaft 44a in a vehicle width direction.

The front axle 72 is rotated by the drive gear. That is, the track belt unit 70 is driven by the engine 40.

To the front frame 30, an upper frame 33 is coupled. As shown in FIG. 2, the upper frame 33 is formed to extend along the periphery of the fuel tank 50. The upper frame 33 extends toward the handlebar 25, that is, obliquely upward and forward of the snowmobile 10.

A sub-frame 34 is coupled to the front frame 30 and the upper frame 33. At the upper end of the upper frame 33, there is provided a steering shaft support 35. The steering shaft support 35 rotatably supports the upper end 24a of the steering shaft 24.

The front frame 30 is also coupled to a front end frame 36 disposed at the front end of the snowmobile 10. At the front end of the snowmobile 10, the front end frame 36 is coupled at the lower end to a lower end frame 37. The lower end frame 37 is coupled at the rear end to the front frame 30.

A coupling portion 23a between the tie rod 22L and the link 23 is supported by the lower end frame 37. In this preferred embodiment, the arm 21 (see FIG. 1), the tie rod 22L (22R) and the link 23 constitute a steering mechanism to which the steerable ski 20L (20R) is attached.

The steering shaft 24 coupled to the link 23 is positioned above the engine 40, specifically the cylinder head 41. The handlebar 25 is positioned in a forward direction of the front axle 72.

In a position below the steering shaft 24, an air cleaner 46 and a radiator 47 are disposed. The air cleaner 46 is positioned between the steering shaft 24 and the engine 40. The radiator 47 is positioned above the air cleaner 46. The radiator 47 is positioned above the engine 40, specifically the cylinder head 41. The radiator 47 is also supported by a bracket 48 attached to the sub-frame 34.

That is, the steering shaft 24 is positioned above the engine 40 and its accessories, specifically the air cleaner 46 and the radiator 47.

Operation of Steering System

Figure 4:
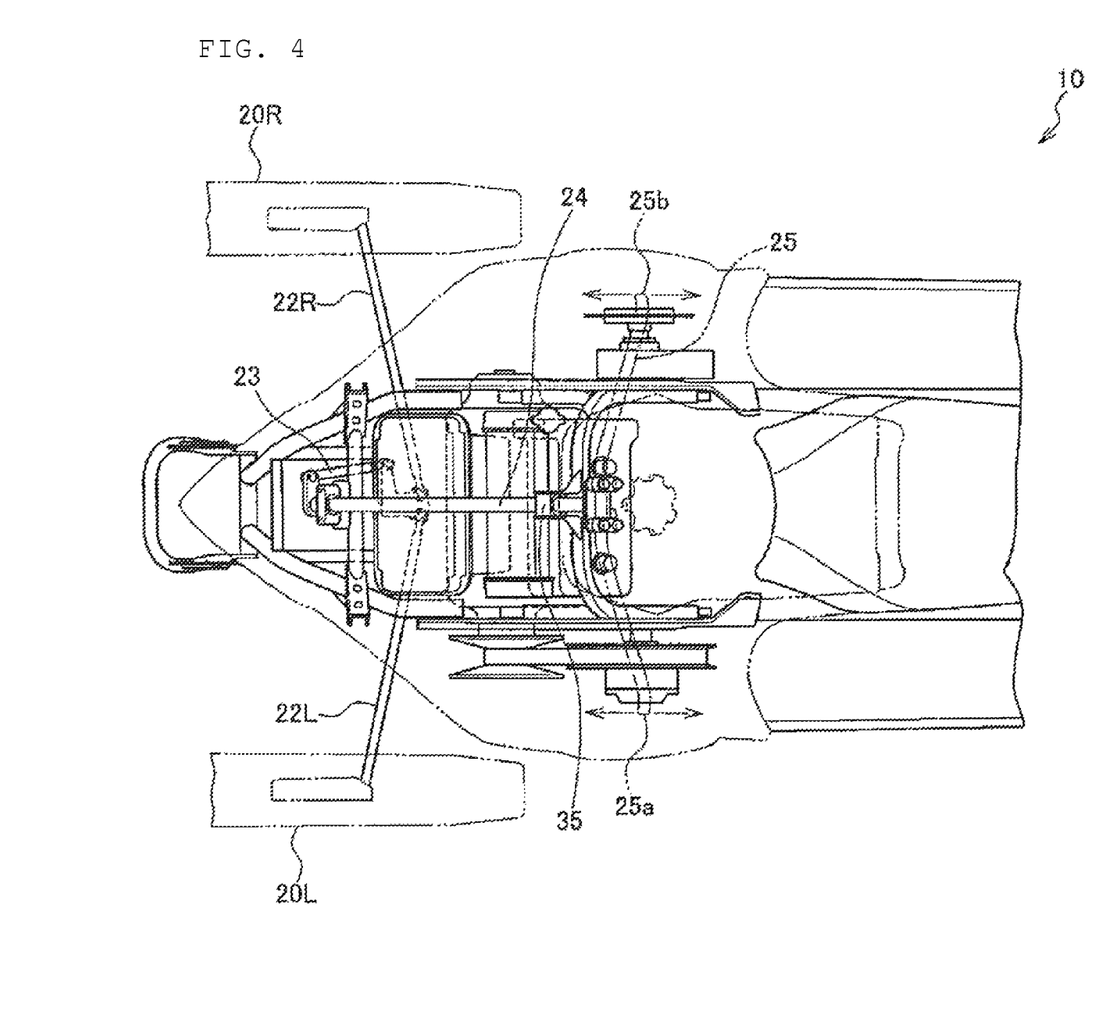
FIG. 4 is an enlarged plan view of the front portion of the snow vehicle in accordance with a preferred embodiment of the present invention.
Figure 5:
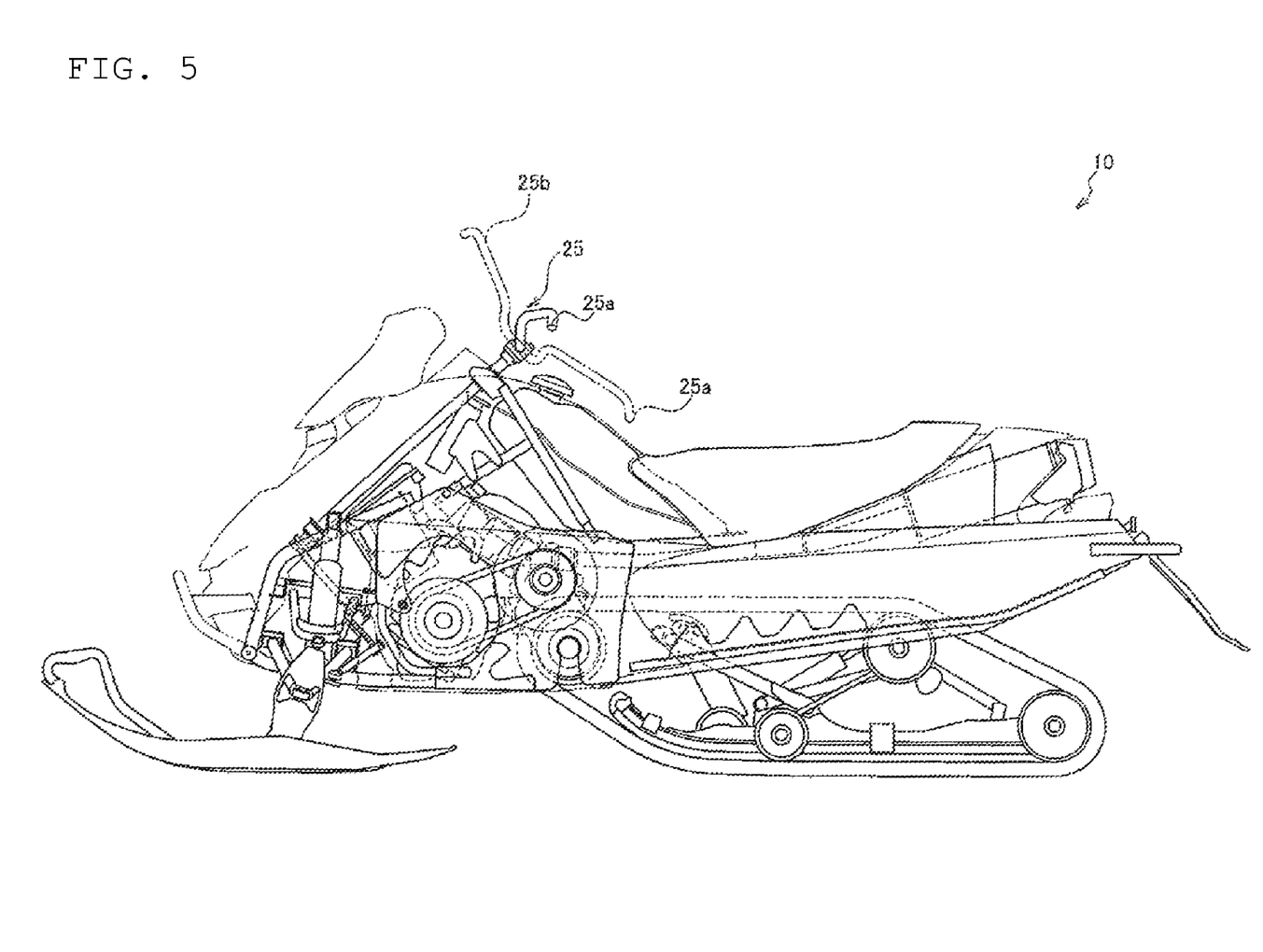
FIG. 5 is a left side elevation of the snow vehicle, illustrating the case where steerable skis are turned to a limit position in a left direction.

Referring now to FIGS. 4 and 5, description will be made of the operation of a steering system, specifically the movement of the steerable skis 20L, 20R during a rider's operation of the handlebar 25. FIG. 4 is an enlarged plan view of a front portion of the snowmobile 10. FIG. 5 is a left side elevation of the snowmobile 10, illustrating the case where the steerable skis 20L, 20R are turned to a limit position in a left direction.

As shown in FIGS. 4 and 5, the handlebar 25 is pivotable in the direction indicated by the arrows about the steering shaft support 35. As the rider turns the handlebar 25, the steering shaft 24 rotates. The rotation of the steering shaft 24 is converted to lateral movement through the link 23 and the tie rods 22L, 22R.

As the steerable skis 20L, 20R are turned to a limit position in a steering direction, the lateral end of the handlebar 25 in the steering direction will be positioned below the steering shaft support 35. For example, as shown in FIG. 5, as the steerable skis 20L, 20R are turned to a limit position in a steering direction, or left direction, the left end 25a of the handlebar 25 is positioned below the steering shaft support 35. On the other hand, the right end 25b of the handlebar 25 on the right of the vehicle, or the opposite side of the steering direction, moves by a relatively large amount to a position above the steering shaft support 35.

Specific Shape of Footrest

Figure 6:
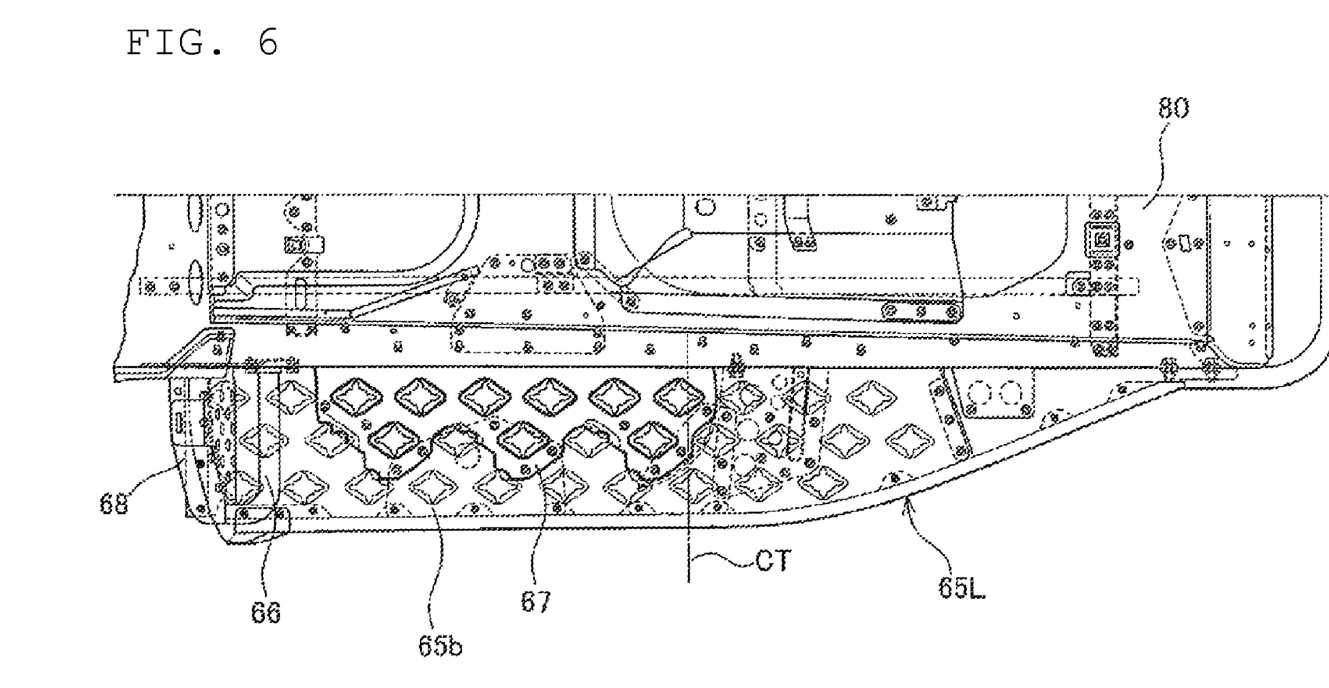
FIG. 6 is a plan view of a footrest and a portion of a rear frame in accordance with a preferred embodiment of the present invention.
Figure 7:
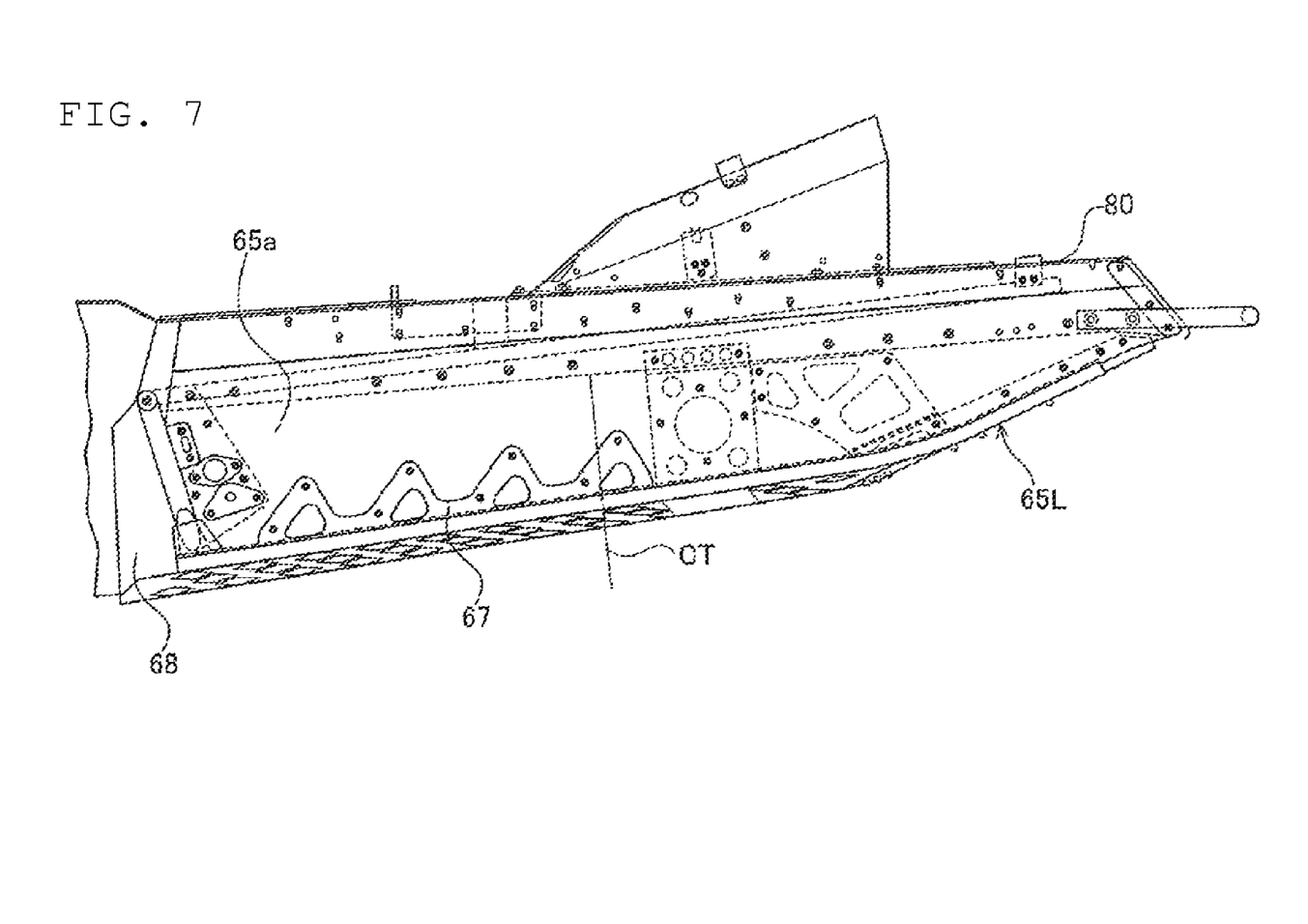
FIG. 7 is a left elevation of the footrest and the part of the rear frame in accordance with a preferred embodiment of the present invention.

FIGS. 6 and 7 illustrate a specific shape of the footrest 65L. FIG. 6 is a plan view of the footrest 65L and a portion of the rear frame 80. FIG. 7 is a left side elevation of the footrest 65L and the rear frame 80. It should be understood that the footrest 65R preferably has a mirror image shape of the footrest 65L.

As shown in FIGS. 6 and 7, the footrest 65L is coupled to the rear frame 80. At the front end of the footrest 65L, there is provided a foot bar 66 (which is not shown in FIG. 7) for holding the rider's foot. The foot bar 66 extends from a wall 65a of the footrest 65L to the outside in the vehicle width direction and is coupled to a stay 68. The rider can thus insert his/her foot (shoe) between the foot bar 66 and a plane surface 65b of the footrest 65L.

The footrest 65L is provided with a foot plate 67. Specifically, the foot plate 67 is mainly formed on an area in front of the central portion CT of the footrest 65L. The footplate 67 is formed on the wall 65a and the plane surface 65b of the footrest 65L. The rider can thus press the sole and/or an inside portion of his/her shoe against the foot plate 67. The footplate 67 preferably includes irregularities as seen in the plan and side views.

Function and Effects

In the snowmobile 10, the straight line L1 is perpendicular or substantially perpendicular to the longitudinal direction of the steering shaft 24, and extends from the upper end of the steering shaft 24 to the footrest 65L (65R) as seen in the side view of the snowmobile 10.

This means that the steering shaft 24, perpendicular or substantially perpendicular to the straight line L extending to the footrest 65L, 65R positioned in a lower portion of the snowmobile 10, is inclined rearward of the snowmobile 10 at a relatively large angle, which allows the rider to take amore natural steering attitude, specifically a more natural standing position.

As a result, the rider who operates the handlebar 25 with his/her feet on the footrests 65L, 65R, specifically in a position in front of the central portion CT in a longitudinal direction of the footrests 65L, 65R, can steer the steerable skis 20L, 20R by pivoting the left end 25a and the right end 25b of the handlebar 25 in a vertical direction. More specifically, since the steering shaft 24 is inclined rearward, the operability of the handlebar 25, specifically the operability of the handlebar 25 while the rider is in a standing position improves.

In this preferred embodiment, the footrests 65L, 65R are positioned below the front end 60a of the seat 60. As a result, even when the rider operates the handlebar 25, which is vertically pivotable, while straddling the seat 60, he/she can take a more natural attitude.

In this preferred embodiment, the steering shaft 24 is positioned above the engine 40 and its accessories, specifically the air cleaner 46 and the radiator 47. More specifically, since the steering shaft 24 does not interfere with the engine 40 and its accessories, it can be arranged to be inclined further rearward.

In accordance with this preferred embodiment, the upper end 24a of the steering shaft 24 is rotatably supported by the steering shaft support 35. This provides enhanced rigidity of the steering shaft 24 and the handlebar 25, and thus an improved operation feeling of the handlebar 25 is provided. In other words, the operability of the handlebar 25 improves.

In this preferred embodiment, as the steerable skis 20L, 20R are turned to the limit position in a left (right) direction, the left end 25a (right end 25b) of the handlebar 25 is positioned below the steering shaft support 35. As a result, the rider can steer the steerable skis 20L, 20R by pivoting the left end 25a and the right end 25b of the handlebar 25 in a vertical direction. More specifically, the operability of the handlebar 25 while the rider is in a standing position improves.

Other Preferred Embodiments

Heretofore, while the present invention has been described based on the above-described preferred embodiment, it should be understood that the description and the drawings forming a part of this disclosure do not limit the scope of this invention. Alternative embodiments based on the disclosure will be apparent to those skilled in the art.

For example, in the foregoing preferred embodiment, as the steerable skis 20L, 20R are turned to the limit position in a left (right) direction, the left end 25a (right end 25b) of the handlebar 25 is preferably positioned below the steering shaft support 35. However, the left end 25a (right end 25b) of the handlebar 25 may not necessarily be positioned below the steering shaft support 35 as the steerable skis 20L, 20R are turned to the limit position in a left (right) direction.

In the foregoing preferred embodiment, the upper end 24a of the steering shaft 24 preferably is rotatably supported by the steering shaft support 35. However, the steering shaft support 35 may not necessarily rotatably support the upper end 24a of the steering shaft 24. For example, the steering shaft support 35 may rotatably support a middle portion of the steering shaft 24.

In the foregoing preferred embodiment, the steering shaft 24 is positioned above the engine 40 and its accessories. However, the steering shaft 24 may not be positioned above the engine 40 and its accessories.

In the foregoing preferred embodiment, the footrests 65L, 65R preferably are positioned below the front end 60a of the seat 60. However, the footrests 65L, 65R may not necessarily be positioned below the front end 60a of the seat 60.

Thus, as a matter of course, the present invention includes various other preferred embodiments that are not described herein. Hence, the technical scope of the present invention is defined only by particular matters of the invention as set forth in the appended claims based on the description.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A snow vehicle comprising:
    a track belt unit having an endless track belt;
    a steering mechanism to which a pair of steerable skis positioned in a forward direction of the track belt unit and being steerable to the left and right are attached;
    a rod-shaped steering shaft coupled to the steerable skis via the steering mechanism;
    a rod-shaped handlebar section coupled to the steering shaft and adapted to be gripped by a rider; and
    a pair of left and right footrests which allow the rider to the rest rider's feet thereon; wherein
    a straight line that is perpendicular to a longitudinal direction of the steering shaft extends from an upper end of the steering shaft to each footrest, as seen in a side view of the snow vehicle;
    each footrest extends in a longitudinal direction of the snow vehicle, and the straight line extends to a position in front of a central portion in a longitudinal direction of each footrest; and
    a steering shaft support arranged to rotatably support the upper end of the steering shaft; wherein
    a lateral end of the handlebar section in a steering direction is positioned below the steering shaft support as each steerable ski is turned to a limit position in the steering direction.

2. The snow vehicle according to claim 1, further comprising a seat to be straddled by the rider, wherein each footrest is positioned below a front end of the seat.

3. The snow vehicle according to claim 1, further comprising an engine arranged to drive the track belt unit, wherein the steering shaft is positioned above the engine and an accessory thereof.

* * * * *